UNITED STATES PATENT OFFICE.

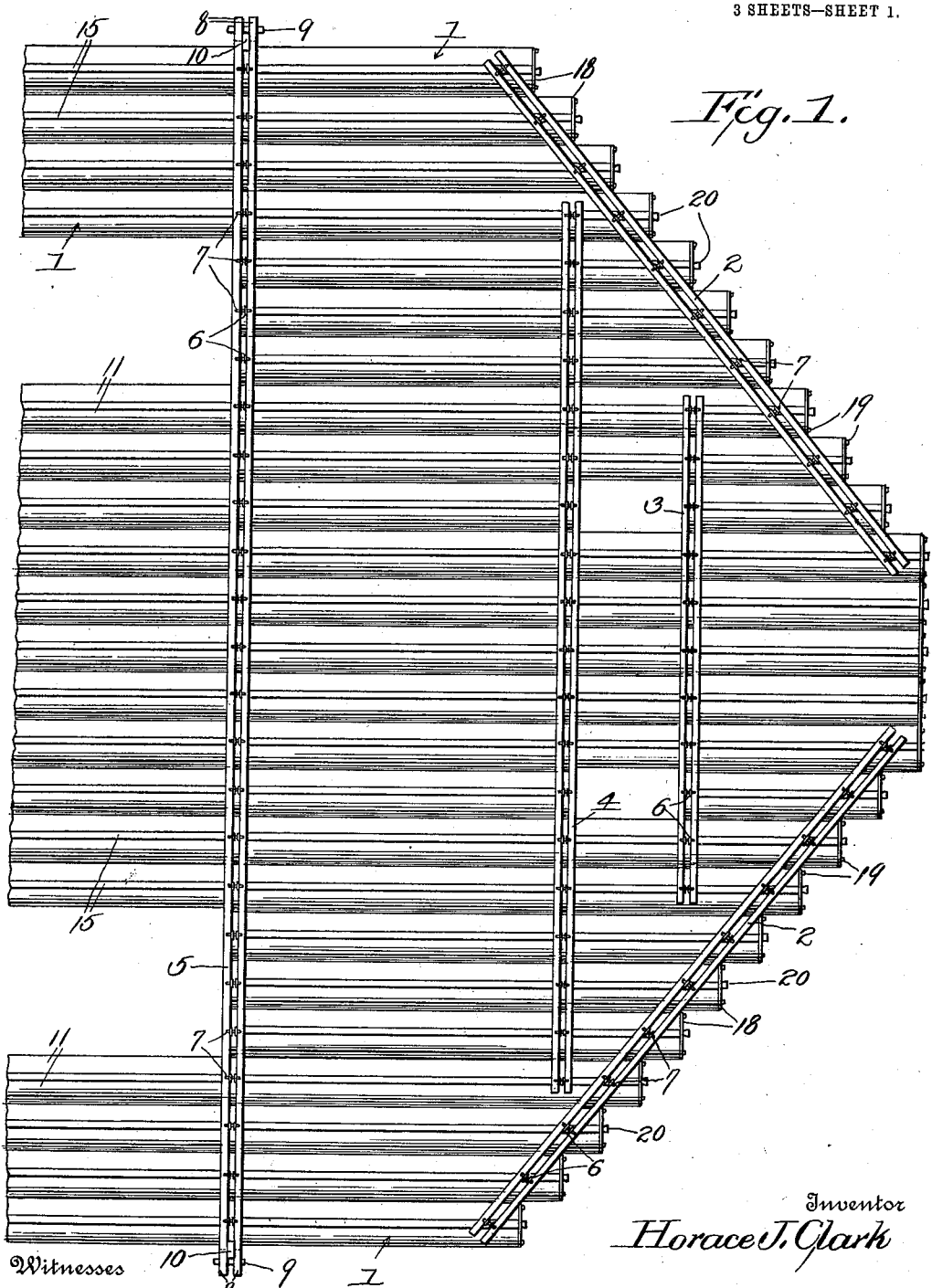

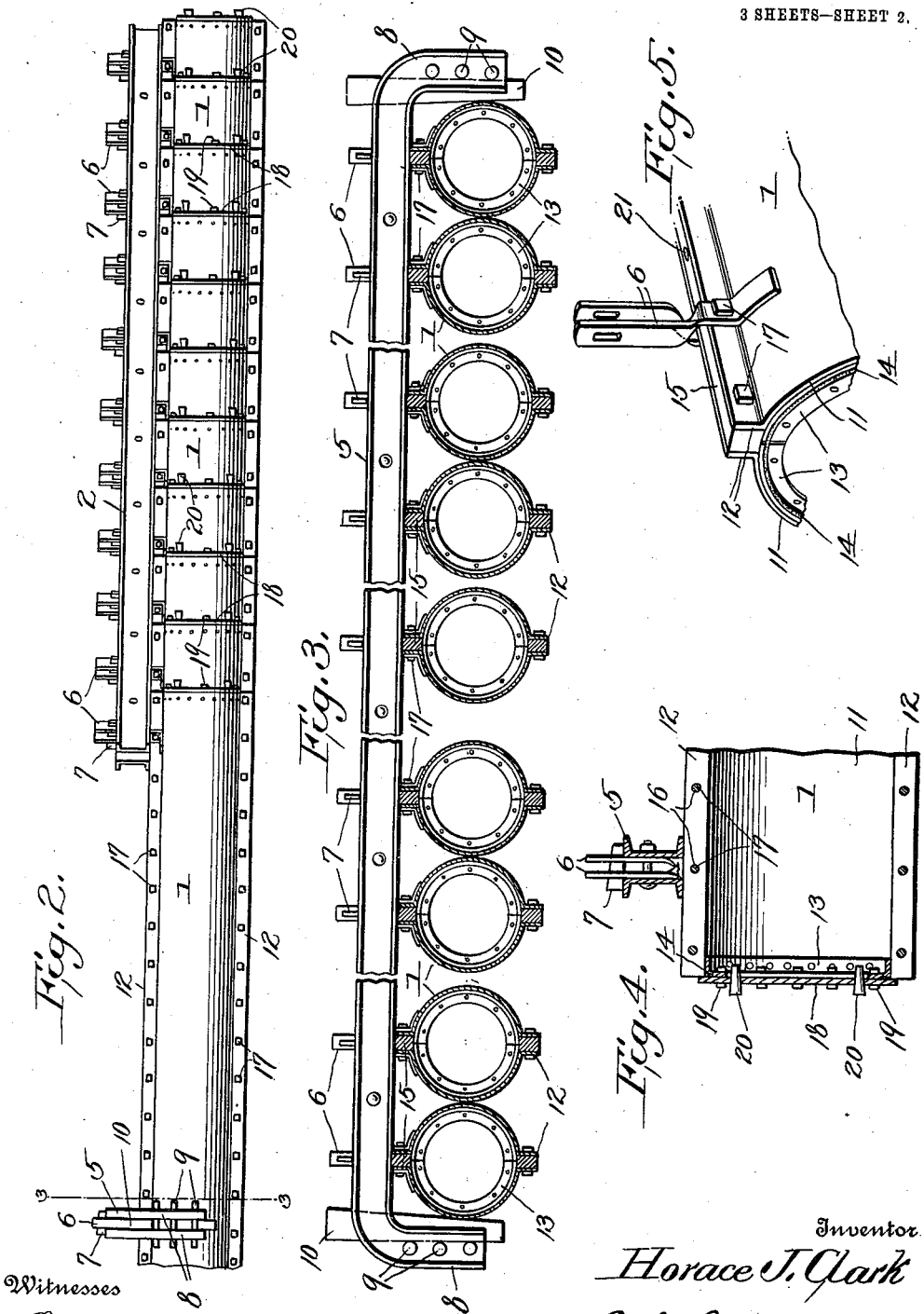

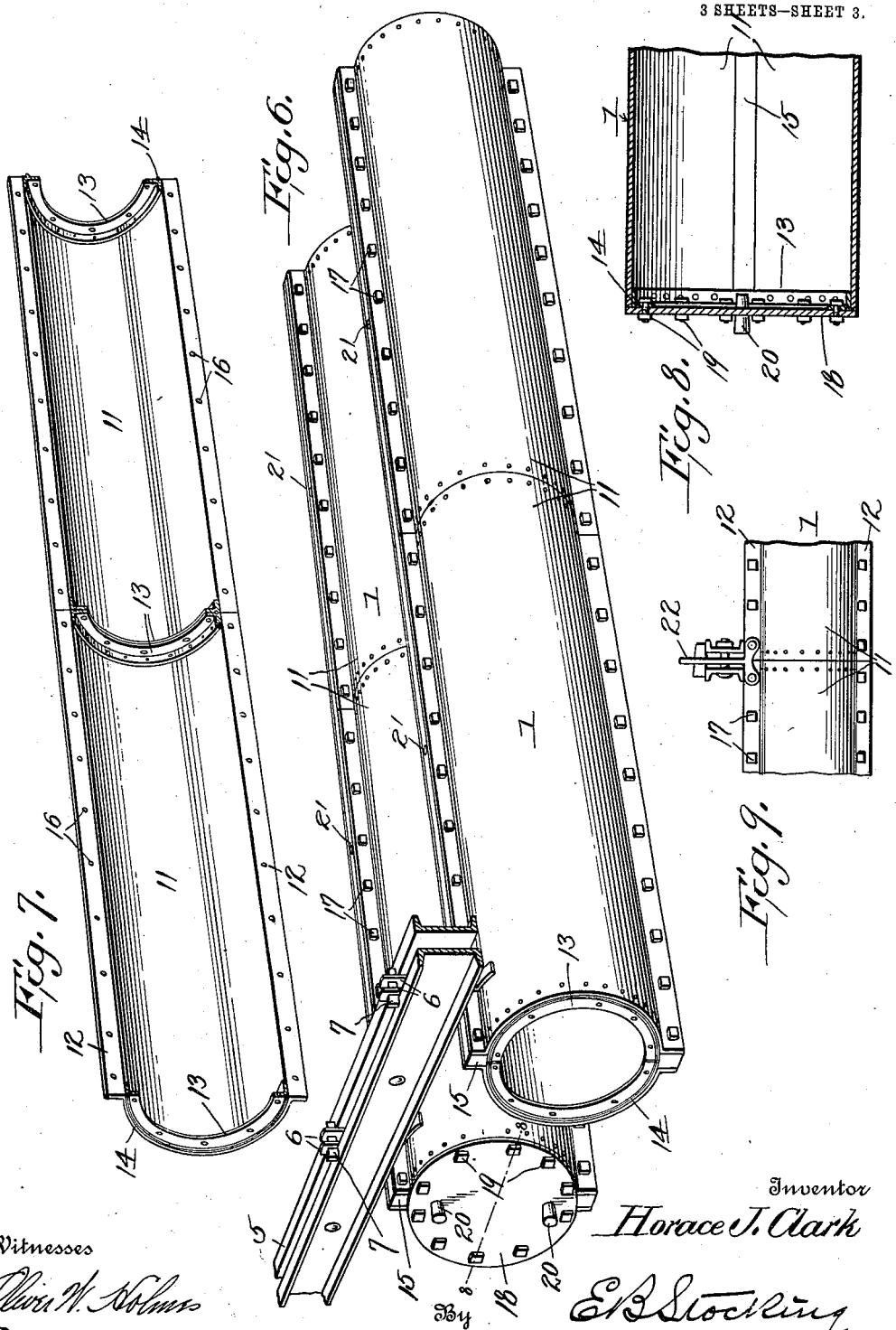

HORACE J. CLARK, OF CHICAGO, ILLINOIS, ASSIGNOR TO THE CLARK DREDGE MANUFACTURING COMPANY, OF CHICAGO, ILLINOIS, A CORPORATION OF MAINE.

RAFT FOR DREDGES.

1,019,224.  Specification of Letters Patent.  Patented Mar. 5, 1912.

Application filed February 23, 1911. Serial No. 610,409.

*To all whom it may concern:*

Be it known that I, HORACE J. CLARK, a citizen of the United States, residing at Chicago, county of Cook, State of Illinois, have invented certain new and useful Improvements in Rafts for Dredges, of which the following is a specification, reference being had therein to the accompanying drawing.

This invention relates to certain new and useful improvements in rafts for supporting hydraulic dredges of various kinds, the main object being to provide a draft formed of a plurality of pipes composed of sections connected together in such a manner that they may be readily taken apart and nested together for shipping purposes, thereby overcoming the difficulties now existing in this class of inventions.

Another object of the invention is to provide pipes which are formed of substantially semi-circular sections having wooden fillers arranged between the flanges thereof to form water-tight joints.

A further object of the invention is to improve the general construction of raft to provide novel means for connecting the pipes forming the raft sidewise in close contact whereby the raft will be strengthened and the pipes held firmly in proper position.

A still further object of the invention is to provide a raft in which the frame is formed of spaced channel bars between which extend the pipe securing members which are locked by wedge shaped pins.

Another object of the invention is to provide novel means for closing the ends of the pipes and connecting the respective abutting ends of the pipe sections to form an exceedingly tight joint.

Other and further objects and advantages of the invention will be hereinafter set forth and the novel features thereof defined by the appended claims.

In the drawings—Figure 1 is a top plan view of the front portion of a raft constructed in accordance with my invention; Fig. 2 is a side elevation of Fig. 1; Fig. 3 is a section taken on line 3—3 of Fig. 2; Fig. 4 is a longitudinal vertical section through the end of one of the pipes showing the manner of closing the same; Fig. 5 is a perspective view of the upper portion of one of the ends of the pipes; Fig. 6 is a detail perspective view of a portion of the raft showing a pair of pipes arranged sidewise; Fig. 7 is a perspective view of one section of a pipe showing the manner of connecting the abutting ends; Fig. 8 is a section taken on line 8—8 of Fig. 6; and Fig. 9 is a detail side elevation of a modification.

Like numerals of reference refer to like parts in the several figures of the drawings.

In carrying out my invention, I employ a plurality of pipes 1 of different lengths arranged sidewise to form a raft, said pipes being held in proper position at their ends by oblique beams 2 and transverse beams 3, 4 and 5, each beam being formed of spaced channel bars between which extend straps 6 having apertured ends adapted to receive wedge shaped pins 7 for fastening the pipes thereto in such a manner that they may be readily placed in position or removed therefrom. The channel bars forming the beam 5 are provided with depending angle ends 8 connected together by bolts 9 which are engaged by wedge shaped wooden pins 10 adapted to be driven down between the channel bars so as to clamp the respective pipe sections and thereby prevent any spreading thereof. In the drawings, I have only shown the front of a raft and it is, of course, understood that a sufficient number of these beams will be employed to hold the pipes in order to form a rigid structure. Each pipe is formed of a plurality of semi-circular sections 11 having vertical flanged edges 12 and said sections are formed of any suitable length, the end of each section carrying a semi-circular flanged ring 13 having an annular groove adapted to receive a packing ring 14 in order to form a tight joint when said sections are clamped together. It will be seen that by this construction, each pipe is so formed that it may be readily taken apart and nested in order to economize in space when shipped. In assembling the pipe sections to form a complete pipe, the sections when built up as shown in Fig. 6, are arranged sidewise, and between the flanges 12 are placed wooden strips 15 having openings adapted to register with openings 16 formed in the flanges 12 and through which bolts 17 are adapted to pass, firmly clamping the sections together in such manner that the wooden strips 15 form a packing in order to form a complete water tight pipe. The outer ends of the complete pipes formed of the different sections, in order to provide a series of floats, are closed by disks 18 which are clamped against packing rings carried by similar sectional flanged rings to those shown at 13 by bolts 19 and said disks are provided with openings closed by plugs 20 in order to allow the water accumulated by leakage to be pumped therefrom and the wooden strips 15 are also provided with plug openings 21 for the same purpose. It will be seen that when the pipes are arranged sidewise, the beams rest upon the flanges 12 and the wooden strips 15 whereby said pipes are held with the flanges in a vertical position. The straps 6 are preferably connected to the respective pipes by the bolts 17 used for clamping the sections together and the lower ends extend partially over the outer surface of the pipes in order to prevent the same from turning or twisting in any way.

The rings 13, arranged at the ends of the sections of the pipe, are preferably riveted to the pipe sections and the flanges are provided with bolt receiving openings so that the sections may be readily clamped together in order to form exceedingly strong and rigid sections whereby each pipe, when constructed in this manner, will have sufficient strength to withstand the strain to which it may be subjected.

As shown in Fig. 1, the raft is constructed with suitable openings to receive the paddle wheels or the dredging machine.

In Fig. 9, a slightly modified form of strap 22 is shown which is connected to the flanges of the pipe, the lower end being formed with arms for this purpose.

From the foregoing description, it will be seen that I have provided a raft which is formed of a plurality of pipes forming floats which are so arranged and connected together that the raft may be easily and quickly assembled and taken apart, the floats being formed of sections bolted together which may also be taken apart and the whole raft packed in a very small space for shipping.

Having described my invention and set forth its merits, what I claim and desire to secure by Letters Patent is—

1. A raft of the kind described comprising a plurality of floats, each float being formed of a plurality of sections bolted together, beams carrying means for holding said floats in their proper relation, and straps and keys for connecting said floats to said beams.

2. A raft of the kind described comprising a plurality of floats arranged sidewise, beams extending transversely and obliquely of said floats, means carried by said beams for forcing said floats together, and straps carried by said floats for connecting said floats to said beams.

3. A raft of the kind described comprising a plurality of floats, transverse beams arranged on said floats having depending ends, said beams being formed of spaced channel bars, and wedge shaped keys arranged between said channel bars at their ends for holding said floats in engagement with each other.

4. A raft for dredges comprising a plurality of floats, each float comprising a sectional pipe, straps carried by said pipes, beams arranged on said pipes, and pins extending through the openings of said straps for securing said pipes to said beams.

5. A raft for dredges comprising a plurality of floats, each float comprising a cylindrical sectional pipe formed of semi-circular flanged sections, packing material arranged between the flanges of said sections, and bolts extending through said flanges.

6. A raft for dredges formed of a plurality of floats, each float comprising a plurality of semi-circular vertically flanged sections bolted together to form pipes, and beams resting on said flanges for holding said pipes in their proper relation.

7. A float for rafts comprising a pipe formed of a plurality of semi-circular sections having flanged longitudinal edges, strips arranged between said flanges, bolts extending transversely through said strips and flanges, semi-circular flanged rings carried by the ends of said sections, packing rings arranged between said semi-circular rings, and bolts for securing the semi-circular rings of one section to the rings of the adjacent section.

8. A float for rafts formed of a sectional pipe having integral vertical flanges, strips arranged between said flanges, and disks for closing the ends of said pipe, the sections of said pipe being connected together by bolts.

9. A raft formed of a plurality of sectional floats, beams arranged transversely of said floats, said beams being formed of spaced channel bars, straps carried by said floats extending up between said channel bars, and transverse wedging keys extending through said straps above said channel bars.

10. A raft comprising a plurality of parallel floats, each float having oppositely disposed longitudinal flanges, beams arranged on the upper flanges of said floats, said beams being formed of spaced channel bars, straps carried by said flanges extending between said channel bars and provided with apertured ends, and wedge shaped keys extending through the apertures of said straps.

11. A raft comprising a plurality of parallel floats, and transverse beams arranged on said floats, said beams being formed of spaced channel bars connected together by bolts, the ends of said beams carrying wedge shaped keys for holding said floats in their proper relation.

12. A raft formed of a plurality of sectional pipes having longitudinal oppositely disposed flanges, transverse beams arranged on said flanges provided with depending ends, wedge shaped keys carried by said ends for holding said floats parallel, and straps carried by said floats connected to said beams.

13. A raft for dredges formed of a plurality of hollow floats, the ends of said floats being closed by disks, said disks being provided with openings, plugs for closing said openings, and a frame carrying wedge-shaped keys for holding said floats in a set position in relation to each other.

14. A float for rafts comprising a substantially tubular sectional pipe, the abutting ends of said sections carrying connecting rings, packing rings arranged between said connecting rings, said pipe being formed of semi-circular sections having flanged edges, wooden strips arranged between the flanges of said sections, and transverse bolts extending through said flanges and strips.

15. A raft formed of a plurality of parallel pipes, each pipe being formed of a plurality of longitudinal and transverse sections bolted together.

16. A sectional float for rafts formed of semi-circular longitudinally flanged sections, each section having a semi-circular connecting ring at its end, strips of wood arranged between the flanges of said sections, packing rings arranged between the semi-circular connecting rings, and disks for closing the ends of said floats.

17. A raft comprising a plurality of floats arranged in contact with one another, beams arranged on said floats having openings, straps carried by said floats extending through said openings having apertures, and keys extending through said apertures above said beams.

18. A raft formed of a plurality of sectional floats having oppositely disposed flanges, transverse and oblique beams arranged, straps carried by said floats extending, said flanges having apertured ends, pins extending through said apertured ends of said straps for connecting said straps to said beams, the central transverse beams having wedging members for forcing said floats together.

In testimony whereof I affix my signature in presence of two witnesses.

HORACE J. CLARK.

Witnesses:
DONALD J. CLARK,
FLORENA TURNER NEWELL.